United States Patent
Takarabe et al.

(10) Patent No.: US 8,390,590 B2
(45) Date of Patent: Mar. 5, 2013

(54) INFORMATION INPUT APPARATUS AND INFORMATION INPUT METHOD

(75) Inventors: Tomotaka Takarabe, Sapporo (JP); Yoichi Ito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 273 days.

(21) Appl. No.: 12/832,871

(22) Filed: Jul. 8, 2010

(65) Prior Publication Data

US 2011/0007015 A1 Jan. 13, 2011

(30) Foreign Application Priority Data

Jul. 9, 2009 (JP) ................................. 2009-162465

(51) Int. Cl.
*G06F 3/041* (2006.01)
(52) U.S. Cl. ........ 345/173; 345/172; 345/169; 715/771; 715/773; 178/101
(58) Field of Classification Search .................. 345/173, 345/179, 168, 171, 172, 169; 715/771, 773; 178/101
See application file for complete search history.

(56) References Cited

U.S. PATENT DOCUMENTS 6,271,835 B1 * 8/2001 Hoeksma ....................... 345/168
2009/0135147 A1 * 5/2009 Hsu et al. ....................... 345/173
2010/0156807 A1 * 6/2010 Stallings et al. ............... 345/173
2011/0007015 A1 * 1/2011 Takarabe et al. .............. 345/173

FOREIGN PATENT DOCUMENTS

| JP | 403149611 A * | 6/1991 |
|---|---|---|
| JP | 08-087380 A | 4/1996 |
| JP | 2003-348272 A | 12/2003 |
| JP | 2007-140900 A | 6/2007 |
| JP | 2008-287323 A | 11/2008 |
| JP | 2009-048245 A | 3/2009 |
| JP | 2009-093368 A | 4/2009 |
| WO | WO 2009/022607 A1 | 2/2009 |

* cited by examiner

*Primary Examiner* — Lun-Yi Lao
*Assistant Examiner* — Olga Merkoulova
(74) *Attorney, Agent, or Firm* — Kilpatrick Townsend & Stockton LLP

(57) ABSTRACT

An information input apparatus which displays a plurality of buttons on a display unit, detects an indicated position by a positional coordinate detection unit arranged on the display unit and inputs information corresponding to an indicated button includes: an incorrect input judgment unit for judging whether or not input information which is input when a to-be-selected button selected from the plurality of buttons is indicated is incorrect input; a pattern selection unit which makes a user select one button arrangement pattern from a plurality of button arrangement patterns including the to-be-selected button at a predetermined position when the incorrect input judgment unit judges that the input information is incorrect input.

4 Claims, 8 Drawing Sheets

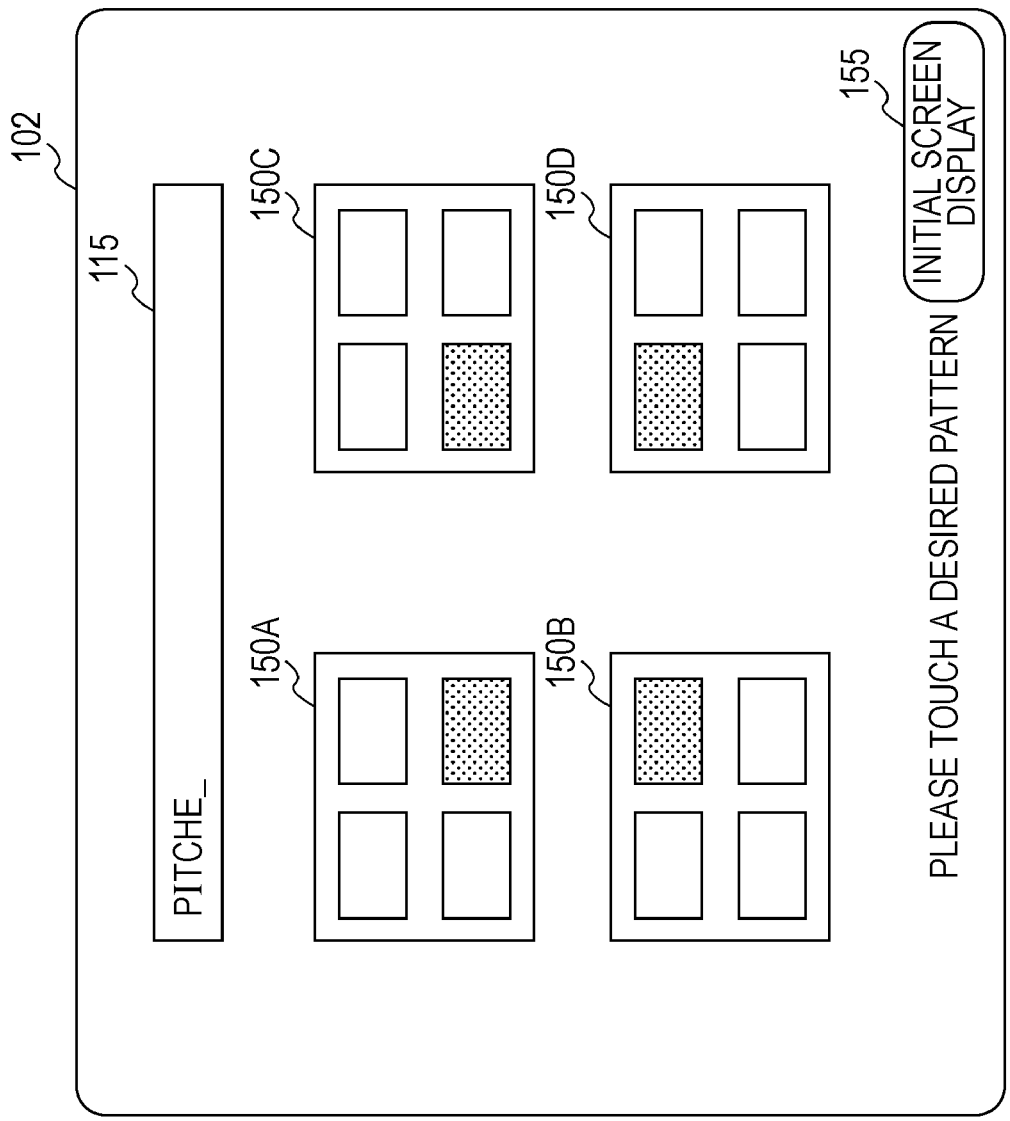

FIG. 6

| KEY POSITION | EFFECTIVE AREA PATTERN | UP | DOWN | LEFT | RIGHT |
|---|---|---|---|---|---|
| UPPER LEFT EDGE | ▨ ▢ / ▢ ▢ | × | × | × | × |
| UPPER RIGHT EDGE | ▢ ▨ / ▢ ▢ | × | × | × | × |
| LOWER LEFT EDGE | ▢ ▢ / ▨ ▢ | × | × | × | × |
| LOWER RIGHT EDGE | ▢ ▢ / ▢ ▨ | × | × | × | × |
| MIDDLE LEFT EDGE | ▢ ▢ / ▨ ▢ | × | ○ | × | × |
| MIDDLE LEFT EDGE | ▨ ▢ / ▢ ▢ | ○ | × | × | × |
| MIDDLE RIGHT EDGE | ▢ ▢ / ▢ ▨ | × | ○ | × | × |
| MIDDLE RIGHT EDGE | ▢ ▨ / ▢ ▢ | ○ | × | × | × |
| UPPER CENTER | ▢ ▨ / ▢ ▢ | × | × | × | ○ |
| UPPER CENTER | ▨ ▢ / ▢ ▢ | × | × | ○ | × |
| LOWER CENTER | ▢ ▢ / ▢ ▨ | × | × | × | ○ |
| LOWER CENTER | ▢ ▢ / ▨ ▢ | × | × | ○ | × |
| CENTER | ▢ ▢ / ▢ ▨ | × | ○ | × | ○ |
| CENTER | ▢ ▢ / ▨ ▢ | × | ○ | ○ | × |
| CENTER | ▢ ▨ / ▢ ▢ | ○ | × | × | ○ |
| CENTER | ▨ ▢ / ▢ ▢ | ○ | × | ○ | × |

INFORMATION INPUT APPARATUS AND INFORMATION INPUT METHOD

This application claims priority to Japanese Patent Application No. 2009-162465, filed Jul. 9, 2009, the entirety of which is incorporated by reference herein.

BACKGROUND

1. Technical Field

The present invention relates to an information input apparatus and an information input method.

2. Related Art

Touch panels are widely used as an input apparatus included in various types of information processing apparatuses. Processings related to buttons displayed at touched positions are executed with the touch panel by touching a display screen with user's finger. In recent years, a user frequently has pressed a wrong button when various settings are executed on one screen. This is because buttons displayed on a touch panel are smaller and spaces between adjacent buttons are narrower as functions of the information processing apparatus are diversified and made complex.

In order to reduce such a mistake that a user presses a wrong button, an information processing apparatus as described in JP-A-2009-93368 has been proposed. When a user presses a button at a wrong position, the information processing apparatus as described in JP-A-2009-93368 stores a difference between a pressed position and a correct press position to correct subsequent press positions based on the stored difference.

However, in the above information processing apparatus, although the press position is corrected, the size of buttons displayed on the display screen and spaces between the adjacent buttons are not changed. Therefore, it has been difficult to correctly press a desired button among buttons which are arranged close to each other.

SUMMARY

An advantage of some aspects of the invention is to realize improving part of the above mentioned issues by the following modes or application examples.

APPLICATION EXAMPLE 1

An information input apparatus according to an aspect of the invention displays a plurality of buttons on a display unit, detects an indicated position by a positional coordinate detection unit arranged on the display unit and inputs information corresponding to the indicated button. The information input apparatus includes an incorrect input judgment unit that judges whether or not input information which is input when a to-be-selected button selected from the plurality of buttons is indicated is incorrect input, a pattern selection unit which makes a user select one button arrangement pattern from a plurality of button arrangement patterns including the to-be-selected button at a predetermined position when the incorrect input judgment unit judges that the input information is incorrect input, an enlarged range extraction unit which extracts a range where the buttons are enlarged in accordance with the button arrangement pattern selected by the pattern selection unit by referring to storage information in which information relating to the buttons included in a specified direction with respect to the to-be-selected button is stored, an enlarged region specification unit which specifies a target region from the plurality of buttons based on the range extracted by the enlarged range extraction unit to enlarge and display the specified target region on the display unit, and a changeable pattern selection unit which makes the user select a selectable button arrangement pattern other than the one button arrangement pattern selected by the pattern selection unit based on the storage information.

With the configuration, when input information is judged to be incorrect input, the information input apparatus makes a user select a button arrangement pattern in which a pressed to-be-selected button is included at a predetermined position. Then, the information input apparatus extracts a range to be enlarged in accordance with the button arrangement pattern selected by the user by referring to storage information relating to the buttons included in a specified direction with respect to the to-be-selected button. Further, the information input apparatus specifies a region to be enlarged from the plurality of buttons based on the extracted range to enlarge and display the region on the display unit. At the same time, the information input apparatus can make the user select the selectable button arrangement pattern other than the selected button arrangement pattern. Accordingly, when the user incorrectly inputs, the user can visually recognize an image of which button region including the incorrectly input to-be-selected button at a predetermined position is enlarged, and select the selectable button arrangement pattern other than the selected button arrangement pattern. Therefore, the user can press a desired button without fail.

APPLICATION EXAMPLE 2

In the information input apparatus according to the above application example, when a second button arrangement pattern is selected from the selectable button arrangement patterns by the changeable pattern selection unit, it is preferable that the enlarged range extraction unit extract a second range where the buttons are enlarged in accordance with the second button arrangement pattern by referring to the storage information, and that the enlarged region specification unit specify a second target region from the plurality of buttons based on the second range to enlarge and display the specified second target region on the display unit in place of the target region displayed on the display unit.

With this configuration, when a second button arrangement pattern is selected by the changeable pattern selection unit, a desired button can be enlarged and displayed because the second target region corresponding to the second button arrangement pattern is displayed in place of the target region displayed on the display unit.

APPLICATION EXAMPLE 3

In the information input apparatus according to the above application example, the storage information may include the button arrangement pattern which can be selected in accordance with a position at which the to-be-selected button is arranged, and a movement direction to the second button arrangement pattern which can be selected by the changeable pattern selection unit with respect to the button arrangement pattern.

APPLICATION EXAMPLE 4

An information input method according to another aspect of the invention displays a plurality of buttons on a display unit, detects an indicated position by a positional coordinate detection unit arranged on the display unit and inputs information corresponding to the indicated button. The information input method includes an incorrect input judgment step for judging whether or not input information which is input when a to-be-selected button selected from the plurality of buttons is indicated is incorrect input; a pattern section step for making a user select one button arrangement pattern from a plurality of button arrangement patterns including the to-be-selected button at a predetermined position when the input information is judged to be incorrect input by the judging of the incorrect input; an enlarged range extraction step for extracting a range where the buttons are enlarged in accordance with the button arrangement pattern selected by the selection of the pattern by referring to storage information in which information relating to the buttons included in a specified direction with respect to the to-be-selected button is stored; an enlarged region specification step for specifying a target region from the plurality of buttons based on the range extracted by the extracting of the range where the buttons are enlarged to enlarge and display the specified target region on the display unit; and a changeable pattern selection step for making the user select a selectable button arrangement pattern other than the one button arrangement pattern selected by the selection of the pattern based on the storage information.

With this method, when input information is judged to be incorrect input, a button arrangement pattern in which a pressed to-be-selected button is included at a predetermined position is selected by a user. Then, a range to be enlarged is extracted in accordance with the button arrangement pattern selected by the user by referring to storage information relating to the buttons included in a specified direction with respect to the to-be-selected button. Further, a region to be enlarged is specified from the plurality of buttons based on the extracted range to enlarge and display the region on the display unit. At the same time, a selectable button arrangement pattern other than the selected button arrangement pattern can be selected by the user. Accordingly, when the user incorrectly inputs, the user can visually recognize an image of which button region including the incorrectly input to-be-selected button at a predetermined position is enlarged, and select a selectable button arrangement pattern other than the selected button arrangement pattern. Therefore, the user can press a desired button without fail.

BRIEF DESCRIPTION OF THE DRAWINGS

The invention will be described with reference to the accompanying drawings, wherein like numbers reference like elements.

FIG. 5 is a diagram illustrating an arrangement pattern selection screen.

FIG. 6 is a diagram illustrating a pattern table.

DESCRIPTION OF EXEMPLARY EMBODIMENTS

Hereinafter, an information input apparatus will be described with reference to accompanying drawings.

Embodiment

Figure 1:
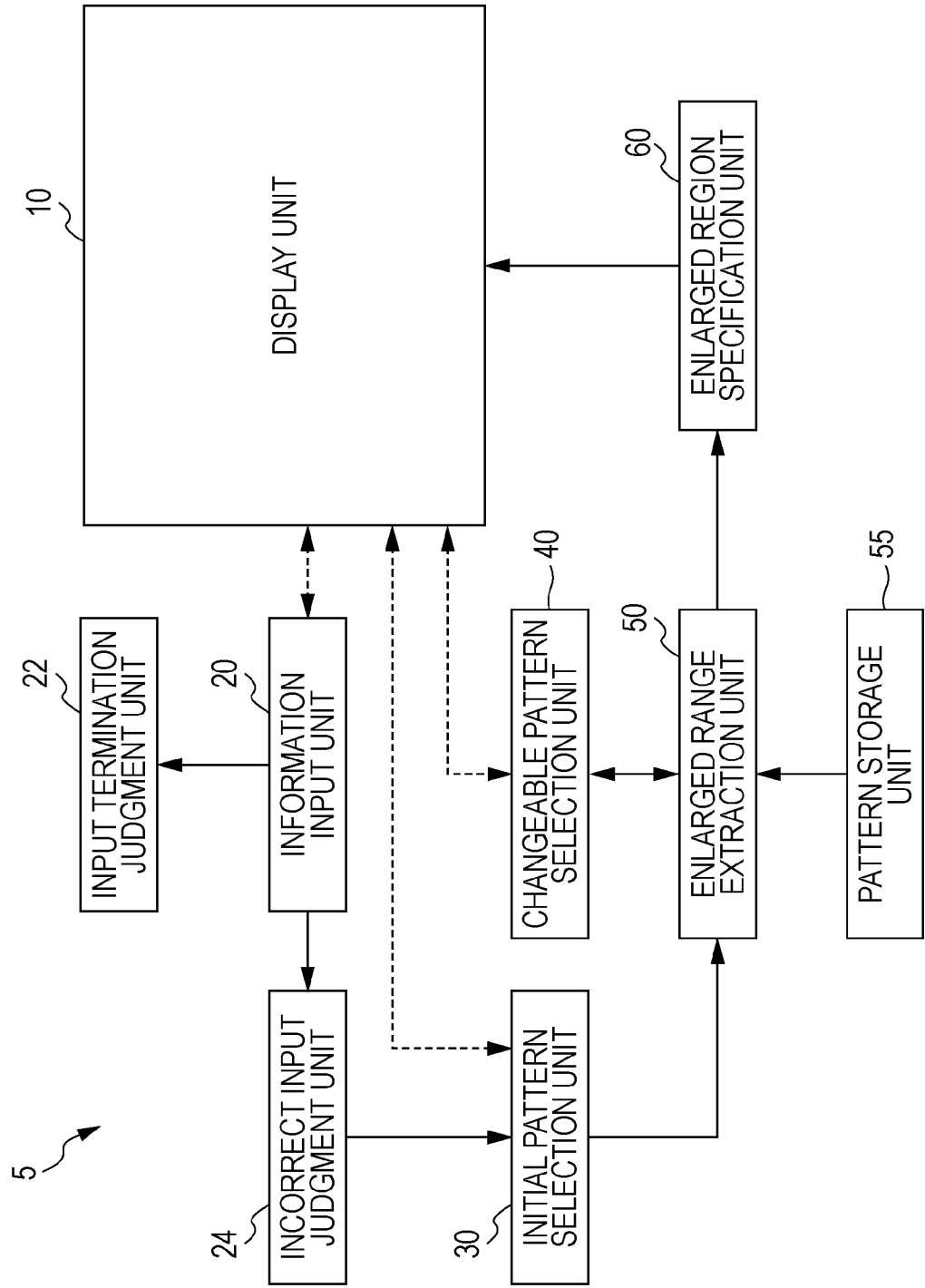
FIG. 1 is a block diagram illustrating a functional configuration of an information input apparatus according to an embodiment of the invention.

FIG. 1 is a block diagram illustrating a functional configuration of an information input apparatus 5. The information input apparatus 5 includes a display unit 10, an information input unit 20, an input termination judgment unit 22, an incorrect input judgment unit 24, an initial pattern selection unit 30, a changeable pattern selection unit 40, an enlarged range extraction unit 50, a pattern storage unit 55, and an enlarged region specification unit 60. It is to be noted that hardware and software which will be described later cooperate with each other so as to realize each function of these functional units. In the embodiment, the information input apparatus 5 is incorporated into an operation panel of an information processing apparatus such as a printer and a copying machine. Further, the information input apparatus 5 provides a user interface function in which an instruction corresponding to a touched position is input when a user presses (touches) the position with a finger.

Figure 2:
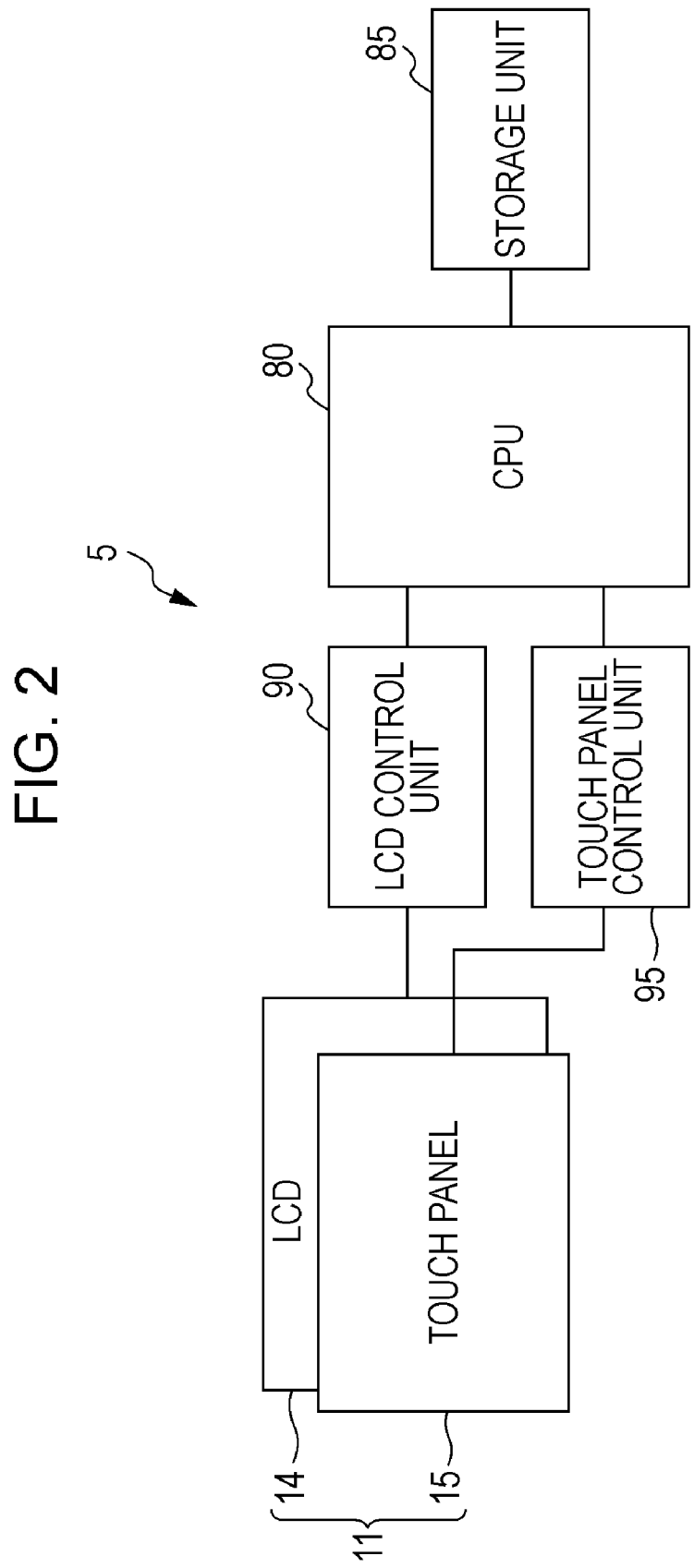
FIG. 2 is a diagram illustrating a hardware configuration of the information input apparatus according to the embodiment of the invention.

FIG. 2 is a diagram illustrating a hardware configuration of the information input apparatus 5. Hardware of the information input apparatus 5 includes a touch panel input apparatus 11, a central processing unit (CPU) 80, a storage unit 85, an LCD control unit 90 and a touch panel control unit 95. The touch panel input apparatus 11 includes a touch panel 15 and a liquid crystal display (LCD) 14.

Figure 3:
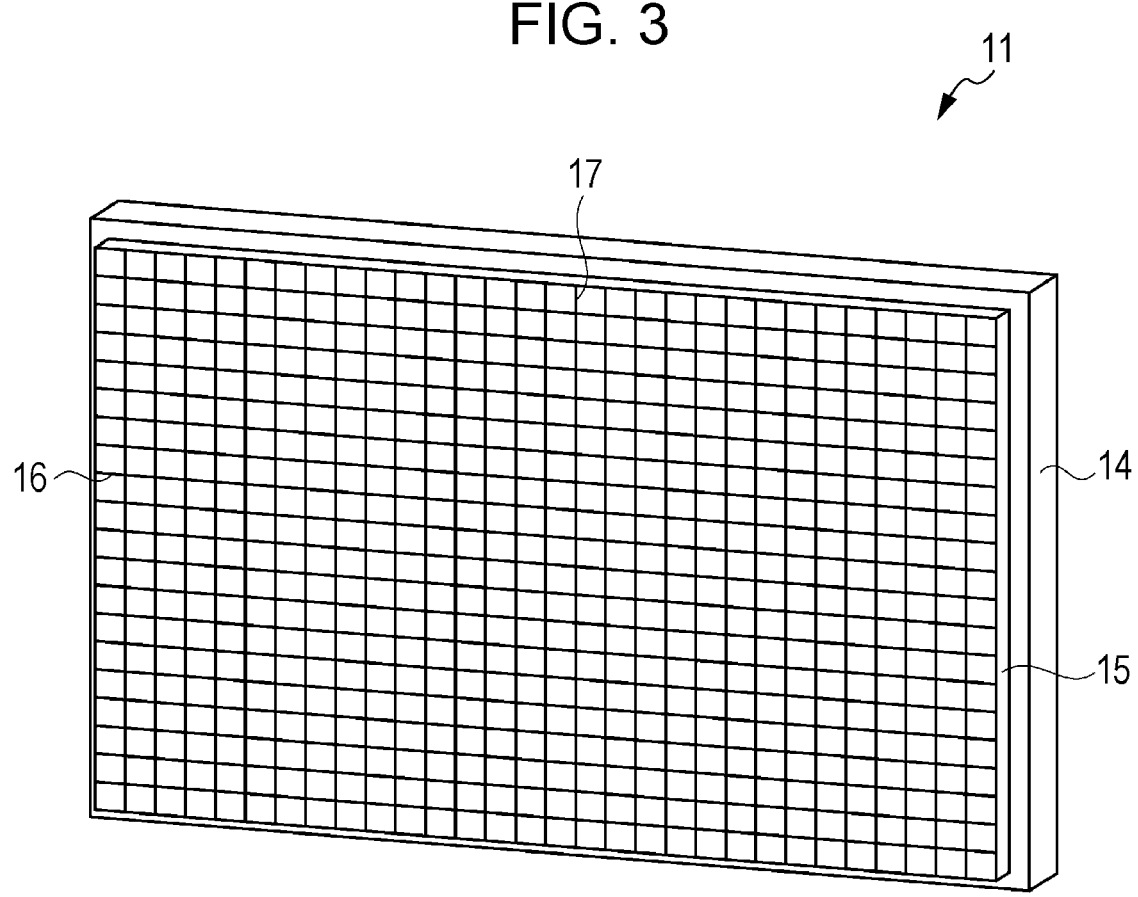
FIG. 3 is a diagram illustrating a configuration of a touch panel input apparatus.

FIG. 3 is a diagram illustrating a configuration of the touch panel input apparatus 11. As is well known, the transparent touch panel 15 is arranged on a surface of the LCD 14 which displays an image so as to have a predetermined positional relationship with the LCD 14. A number of X axis electrode lines 16 are arranged in parallel in a transverse direction on the surface of the touch panel 15. Further, a number of Y axis electrode lines 17 are arranged in parallel in a longitudinal direction on the surface of the touch panel 15. If a user touches the X axis electrode lines 16 and the Y axis electrode lines 17 with a finger, voltage drops are caused on the electrode lines. A position on the touch panel 15 where the user touches with a finger is detected based on the positions of the X axis electrode lines 16 and the Y axis electrode lines 17 where the voltage drops are caused. For example, when the voltage drops are caused on three X axis electrode lines 16 and three Y axis electrode lines 17, an intersection of both middle lines is assumed to be a touched position with a finger.

Note that the touch panel according to the embodiment is not limited to the above-described matrix switch type touch panel. The touch panel according to the embodiment may employ various types such as a resistive film type, a surface acoustic wave type, an infrared-ray type, an electromagnetic induction type, a capacity type or the like.

As described above, the information input apparatus 5 is an apparatus which allows a user to input information through the touch panel 15. In the embodiment, the LCD control unit 90 displays a user interface screen (UI screen) such as the information input unit 20, the initial pattern selection unit 30 and the changeable pattern selection unit 40 on the LCD 14 in accordance with an instruction from the CPU 80. The LCD 14 is as an example of the display unit 10. A desired region on the UI screen displayed on the LCD 14 is touched by the user with a finger so that the touch panel control unit 95 calculates positional coordinates of the touched position on the surface of the touch panel 15 serving as a positional coordinate detection unit. Then, the touch panel control unit 95 inputs the calculated positional coordinates to the CPU 80 so that the CPU 80 executes a function corresponding to the positional coordinates.

Next, details of the functional units of the information input apparatus 5 will be described with reference to FIG. 1.

Figure 4:
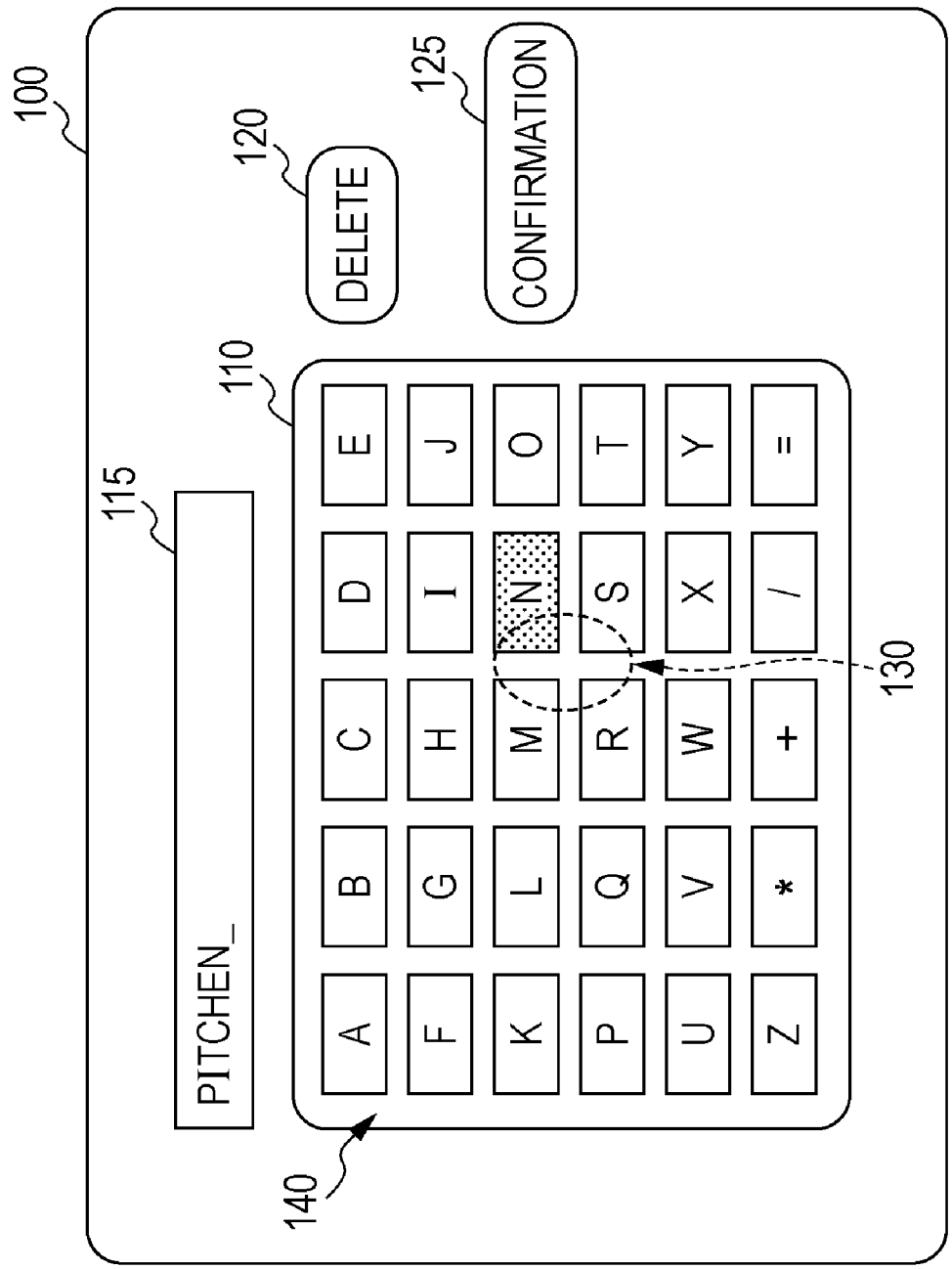
FIG. 4 is a diagram illustrating an initial screen.

The information input unit 20 is an input unit which allows the user to input information. In the embodiment, the information input unit 20 corresponds to character input keys 140 which are a button group as shown in FIG. 4. The user inputs characters by the button group. FIG. 4 illustrates an initial screen 100 which is initially displayed on a display region of the touch panel input apparatus 11. In FIG. 4, the character input keys 140 are arranged on a key input region 110 which is at a center portion of the initial screen 100. In the embodiment, the character input keys 140 correspond to alphabets and special symbols. Displayed characters and symbols are related to the keys, respectively.

A display region 115 on which characters input by the character input keys 140 are sequentially displayed is arranged above the key input region 110 on the initial screen 100. A delete key 120 and a confirmation key 125 are arranged on the right side of the key input region 110 on the initial screen 100. FIG. 4 illustrates a touch region 130 touched by the user. The touch region 130 is a substantially center portion of an "M" key, an "R" key, an "N" key and an "S" key of the character input keys 140 in FIG. 4. In this case, "N" is displayed at the end of a character string displayed on the display region 115 on the assumption that the "N" key is touched as an incorrect input key.

Referring again to FIG. 1, the incorrect input judgment unit 24 judges incorrect input by the user. In the embodiment, the incorrect input judgment unit 24 corresponds to the delete key 120 on the initial screen 100. The user touches the delete key 120 to delete the character "N" which is finally input by the character input key 140 and displayed on the display region 115. Therefore, the character "N" is judged to be incorrect input. When the incorrect input judgment unit 24 judges the incorrect input, the incorrect input judgment unit 24 transmits information relating to the incorrect input judgment to the initial pattern selection unit 30. It is to be noted that the incorrect input judgment unit 24 is not limited to the delete key 120 and can be supposed to be a "Delete" key or a "BackSpace" key.

The input termination judgment unit 22 judges input termination by a user. In the embodiment, the input termination judgment unit 22 corresponds to the confirmation key 125 on the initial screen 100. The user touches the confirmation key 125 to confirm the characters input by the user. Then, the process proceeds to a subsequent process. Further, the input termination judgment unit 22 may be an "Enter" key for confirming input.

The initial pattern selection unit 30 is a selection unit which makes the user select an arrangement pattern of the keys to be enlarged (button arrangement pattern). In the embodiment, the initial pattern selection unit 30 corresponds to an arrangement pattern selection screen 102, as shown in FIG. 5. When the information relating to the incorrect input judgment is transmitted from the incorrect input judgment unit 24, the arrangement pattern selection screen 102 is displayed on the display region of the touch panel input apparatus 11 in place of the initial screen 100. Selectable key arrangement patterns 150A, 150B, 150C, 150D are displayed on the arrangement pattern selection screen 102. The user touches any one of the arrangement patterns so that the touched arrangement pattern is confirmed. Information relating to the confirmed arrangement pattern is transmitted to the enlarged range extraction unit 50. In the embodiment, the "N" key incorrectly input on the initial screen 100 is displayed so as to be identified on the selectable key arrangement patterns 150A, 150B, 150C, 150D. Four patterns each of which includes the "N" key at a predetermined position among four keys are displayed as selectable patterns. In this case, the predetermined positions of the "N" key are lower right, upper right, lower left and upper left. It is to be noted that the keys constituting each pattern are not limited to four keys and the selectable patterns may be different depending on the number of keys constituting each pattern. Further, an initial screen display key 155 is displayed at a lower right portion on the arrangement pattern selection screen 102. When the user touches the initial screen display key 155, the initial screen 100 on which all of the character input keys 140 are displayed is displayed on the display region of the touch panel input apparatus 11 in place of the arrangement pattern selection screen 102.

The enlarged range extraction unit 50 extracts a range to be enlarged from the character input keys 140 with reference to a pattern table stored in the pattern storage unit 55. In this case, the enlarged range extraction unit 50 extracts the range in accordance with the arrangement pattern selected by the initial pattern selection unit 30 or the arrangement pattern selected by the changeable pattern selection unit 40. The pattern table (FIG. 6), which shows arrangement patterns of the peripheral keys of the touched button with respect to specified directions of the touched button, is previously stored in the pattern storage unit 55. For example, when the position of the incorrect input key is at an upper left edge of the key input region 110, as shown in FIG. 6, an effective area pattern is only one pattern in which an incorrect input key is arranged at the upper left. The effective area pattern shows a selectable button arrangement pattern in accordance with the position at which the incorrect input key is arranged. Information relating to the enlarged range extracted by the enlarged range extraction unit 50 is transmitted to the enlarged region specification unit 60. The arrangement patterns of the peripheral keys of the touched button with respect to the specified directions thereof are referred to by the changeable pattern selection unit 40 if needed.

The enlarged region specification unit 60 specifies a region to be enlarged from the key input region 110 based on the information relating to the enlarged range, which is transmitted from the enlarged range extraction unit 50. Then, the enlarged region specification unit 60 enlarges an image of the specified region to display the image on the display unit 10 in a selectable manner. For example, when the user selects the arrangement pattern 150B in FIG. 5, the enlarged range extraction unit 50 acquires the arrangement pattern of the peripheral keys corresponding to the selected arrangement pattern 150B. At this time, the enlarged region specification unit 60 specifies a region corresponding to the acquired arrangement pattern of the peripheral keys. In this case, a region where the "N" key is arranged at the upper right, the "S" key is arranged at the lower right, the "M" key is arranged at the upper left and the "R" key is arranged at the lower left is specified. Each of the "S" key, the "M" key and the "R" key is adjacent to the "N" key.

The changeable pattern selection unit 40 is a selection unit which makes the user select a selectable arrangement pattern other than the arrangement pattern selected by the initial pattern selection unit 30 based on the pattern table. At this time, the selectable arrangement pattern is determined based on the position of the incorrectly input "N" key on the character input keys 140 and the position of the "N" key on the arrangement pattern selected by the initial pattern selection unit 30, as shown in the pattern table of FIG. 6. For example, in the case of the "N" key, since the "N" key is not at the edge position, the "N" key is classified into center. Further, the effective area pattern is the arrangement pattern 150B in which the incorrect input key is at the upper right portion. Therefore, the display movements in the directions of the selectable arrangement patterns 150A, 150D with respect to the arrangement pattern 150B, that is, display movements to the upper side and right side are effective, as shown in FIG. 6.

When an arrangement pattern (second arrangement pattern) which is different from the arrangement pattern selected by the initial pattern selection unit 30 is selected by the user in the changeable pattern selection unit 40, information relating to the second arrangement pattern is transmitted to the enlarged range extraction unit 50. Further, the enlarged region specification unit 60 specifies a region to be enlarged based on the second arrangement pattern so as to display the specified region on the display unit 10.

Figure 7:
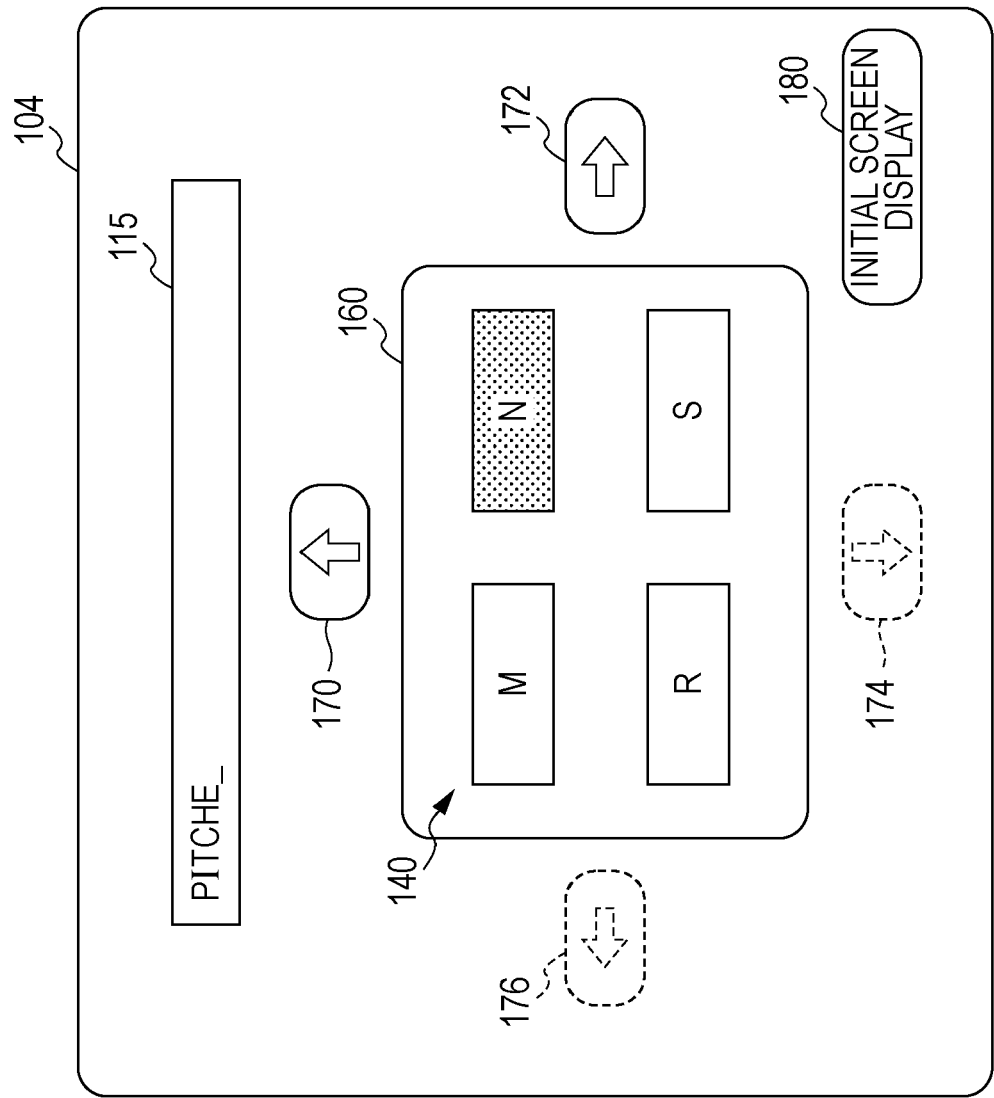
FIG. 7 is a diagram illustrating a key-enlarged display screen.

FIG. 7 is a diagram illustrating a key enlarged display screen 104 in which the region specified by the enlarged region specification unit 60 is displayed on the display unit 10. An enlarged key input region 160 is displayed at the center of the key enlarged display screen 104. The region specified by the enlarged region specification unit 60, that is to say, the "N" key, the "S" key, the "M" key and the "R" key and display spaces between these keys are enlarged and displayed in the enlarged key input region 160 in a selectable manner.

On the key enlarged display screen 104, the changeable pattern selection units 40 are displayed as arrow buttons 170, 172, 174, 176 around the enlarged key input region 160. In this case, the arrow buttons 170, 172, 174, 176 correspond to the selectable arrangement patterns. In the embodiment, since the display movements to the upper side and right side are effective as described above, the arrow button 170 indicating the upper direction and the arrow button 172 indicating the right direction are displayed so as to be selectable. On the other hand, the "N" key is not arranged in patterns other than the two patterns as described above. Therefore, other arrow buttons 174, 176 may be displayed as impossible to be selected or may not be displayed. In the embodiment, the arrow buttons 170, 172, 174, 176 indicating the directions are adopted. However, the changeable pattern selection units are not limited to the arrow buttons and character buttons such as "up", "down", "right" and "left" may be adopted.

When the arrow button 170 indicating the upper direction is touched, the arrangement pattern (the arrangement pattern 150A) in which the "N" key is arranged at the lower right, the "M" key is arranged at the lower left, an "I" key is arranged at the upper right and an "H" key is arranged at the upper left is displayed on the enlarged key input region 160. In this case, the arrow button 174 indicating the lower direction and the arrow button 172 indicating the right direction are displayed so as to be selectable. On the other hand, when the arrow button 172 indicating the right direction is touched, the arrangement pattern (the arrangement pattern 150D) in which the "N" key is arranged at the upper left, the "S" key is arranged at the lower left, an "O" key is arranged at the upper right and a "T" key is arranged at the lower right is displayed on the enlarged key input region 160. In this case, the arrow button 170 indicating the upper direction and the arrow button 176 indicating the left direction are displayed so as to be selectable.

Further, an initial screen display key 180 is displayed at the lower right portion on the key enlarged display screen 104. When the user touches the initial screen display key 180, the initial screen 100 which displays all of the character input keys 140 is displayed on the display region of the touch panel input apparatus 11 in place of the key enlarged display screen 104. In the case where any keys are not touched for a predetermined period of time, the initial screen 100 may be displayed on the assumption that the initial screen display key 180 is touched.

Figure 8:
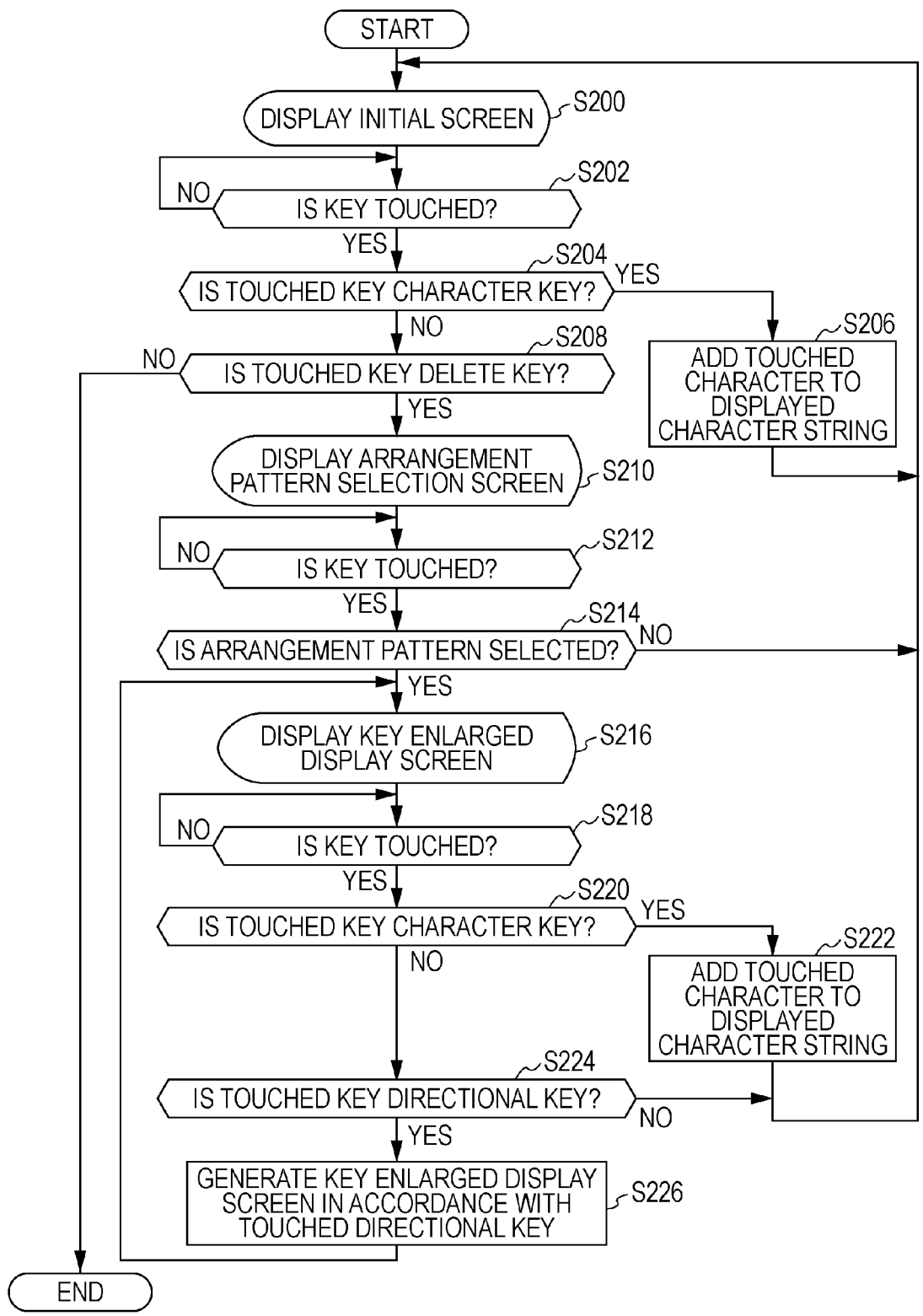
FIG. 8 is a flowchart illustrating a flow of processing in the information input apparatus according to the embodiment of the invention.

FIG. 8 is a flowchart illustrating a flow of information input processing in the information input apparatus 5. When the processing of the information input apparatus 5 is started, the CPU 80 displays the initial screen 100 on the display region of the touch panel input apparatus 11, first (step S200 (hereinafter called as Sn, n=1, 2, 3 and so on)). Subsequently, the CPU 80 judges whether some key is touched by the user (S202). When any keys are not touched (No at S202), the step is repeated. On the other hand, when some key is judged to be touched (Yes at S202), the CPU 80 judges whether the touched key is the character input key 140 (S204).

At this time, when the touched key is judged to be the character input key 140 (Yes at S204), the CPU 80 adds a character corresponding to the touched character input key 140 to the end of the displayed character string displayed on the display region 115 (S206). Then, the step returns to the step where the initial screen 100 is displayed (S200). On the other hand, when the touched key is not judged to be the character input key 140 (No at S204), the CPU 80 judges whether or not the touched key is the delete key 120 (S208) (incorrect input judgment step).

At this time, when the touched key is not judged to be the delete key 120 (No at S208), the CPU 80 judges that the touched key is the confirmation key 125. Then, a series of the information input processing is terminated to proceed to the subsequent processing step.

On the other hand, when the touched key is judged to be the delete key 120 (Yes at S208), the CPU 80 displays the arrangement pattern selection screen 102 on the display region of the touch panel input apparatus 11 (S210) (pattern selection step). Subsequently, the CPU 80 judges whether some key is touched by the user (S212). When any keys are not touched (No at S212), the step is repeated. On the other hand, when some key is judged to be touched (Yes at S212), the CPU 80 judges whether some arrangement pattern is selected (S214).

At this time, when any arrangement patterns are not judged to be selected (No at S214), the CPU 80 judges that the initial screen display key 155 is touched. Then, the step returns to the step where the initial screen 100 is displayed (S200). On the other hand, when some arrangement pattern is judged to be selected (Yes at S214), the CPU 80 displays the key enlarged display screen 104 on the display region of the touch panel input apparatus 11 (S216) (enlarged range extraction step and enlarged region specification step).

Subsequently, the CPU 80 judges whether some key is touched by the user (S218). When any keys are not touched (No at S218), the step is repeated. On the other hand, when some key is judged to be touched (Yes at S218), the CPU 80 judges whether the touched key is the character input key 140 (S220).

At this time, when the touched key is judged to be the character input key 140 (Yes at S220), the CPU 80 adds a character corresponding to the touched character input key 140 to the end of the displayed character string displayed on the display region 115 in place of the deleted character (S222). Then, the step returns to the step where the initial screen 100 is displayed (S200). On the other hand, when the touched key is not judged to be the character input key 140 (No at S220), the CPU 80 judges whether the touched key is a directional key which is either of the selectable arrow buttons 170, 172 (S224).

At this time, when the directional key is judged to be touched (Yes at 224), the CPU 80 generates the key enlarged display screen 104 corresponding to the touched directional key (S226) (changeable pattern selection step). Then, the step returns to the step where the generated key enlarged display screen 104 is displayed on the display region of the touch panel input apparatus 11 (S216).

On the other hand, when the directional key is not judged to be touched (No at 224), the CPU 80 judges that the initial screen display key 180 is touched. Then, the step returns to the step where the initial screen 100 is displayed (S200).

According to the above-described embodiment, when the character information is incorrectly input, the information input apparatus 5 enlarges the peripheral keys which include the incorrectly input key and are in the selected direction to display the peripheral keys on the display unit 10. At the same time, the information input apparatus 5 further displays the selectable directions on the display unit 10. When a different direction is selected, the information input apparatus 5 enlarges the peripheral keys which include the incorrectly input key and are in the direction which is selected next to display the peripheral keys on the display unit 10. Accordingly, the user can easily touch a desired key among the displayed keys without fail because the peripheral keys including the desired key and display spaces between the keys are enlarged and displayed.

The embodiment has been described with reference to the accompanying drawings. However, the detail configuration is not limited to the embodiment. The invention encompasses a design change and the like without departing from the scope of the invention. For example, the button arrangement pattern in the initial pattern selection unit 30 may be previously selected by a user and the arrangement pattern selection screen 102 may not be displayed.

What is claimed is:

1. An information input apparatus which displays a plurality of buttons on a display unit, detects an indicated position by a positional coordinate detection unit arranged on the display unit and inputs information corresponding to an indicated button, comprising:

an incorrect input judgment unit for judging whether or not input information which is input when a to-be-selected button selected from the plurality of buttons is indicated is incorrect input;

a pattern selection unit which makes a user select one button arrangement pattern from a plurality of button arrangement patterns each including the to-be-selected button at a predetermined position when the incorrect input judgment unit judges that the input information is incorrect input, the pattern selection unit to display the plurality of button arrangement patterns together on the display unit;

an enlarged range extraction unit which extracts a range where the buttons are enlarged in accordance with the button arrangement pattern selected by the pattern selection unit by referring to storage information in which information relating to the buttons included in a specified direction with respect to the to-be-selected button is stored;

an enlarged region specification unit which specifies a target region from the plurality of buttons based on the range extracted by the enlarged range extraction unit to enlarge and display the specified target region on the display unit; and a changeable pattern selection unit which makes the user select a selectable button arrangement pattern other than the one button arrangement pattern selected by the pattern selection unit based on the storage information.

2. The information input apparatus according to claim 1, wherein when a second button arrangement pattern is selected from the selectable button arrangement patterns by the changeable pattern selection unit, the enlarged range extraction unit extracts a second range where the buttons are enlarged in accordance with the second button arrangement pattern by referring to the storage information, and the enlarged region specification unit specifies a second target region from the plurality of buttons based on the second range to enlarge and display the specified second target region on the display unit in place of the specified target region which is displayed on the display unit.

3. The information input apparatus according to claim 1, wherein the storage information includes the button arrangement pattern which is selectable in accordance with a position at which the to-be-selected button is arranged, and a movement direction to the second button arrangement pattern which is selectable by the changeable pattern selection unit with respect to the button arrangement pattern.

4. An information input method which displays a plurality of buttons on a display unit, detects an indicated position by a positional coordinate detection unit arranged on the display unit and inputs information corresponding to an indicated button, comprising:

judging whether or not input information which is input when a to-be-selected button selected from the plurality of buttons is indicated is incorrect input;

making a user select one button arrangement pattern from a plurality of button arrangement patterns each including the to-be-selected button at a predetermined position when the input information is judged to be incorrect input by the incorrect input judging, the plurality of button arrangement patterns being displayed together on the display unit;

extracting an enlarged range where the buttons are enlarged in accordance with the button arrangement pattern selected by the selection of the pattern by referring to storage information in which information relating to the buttons included in a specified direction with respect to the to-be-selected button is stored;

specifying an enlarged target region from the plurality of buttons based on the range extracted by the extracting of the range where the buttons are enlarged to enlarge and display the specified target region on the display unit; and selecting a changeable pattern to make the user select a selectable button arrangement pattern other than the one button arrangement pattern selected by the pattern selection based on the storage information.

\* \* \* \* \*